United States Patent [19]

Langshaw

[11] Patent Number: 5,385,106

[45] Date of Patent: Jan. 31, 1995

[54] HOT WATER/STEAM WEED KILLING SYSTEM

[76] Inventor: Eric Langshaw, P.O. Box 91, Field, British Columbia, Canada, V0A 1G0

[21] Appl. No.: 934,195

[22] Filed: Aug. 24, 1992

[51] Int. Cl.⁶ .................. A01C 23/00; A01C 15/00
[52] U.S. Cl. .................... 111/127; 111/118; 239/135; 239/75; 239/130
[58] Field of Search .......... 239/130, 75, 63, 135, 239/152, 154

[56] References Cited

U.S. PATENT DOCUMENTS

| | | | |
|---|---|---|---|
| 1,694,806 | 12/1928 | Yale | 239/130 |
| 1,804,592 | 5/1937 | Chase | 239/130 |
| 2,157,915 | 5/1939 | Olson . | |
| 2,683,626 | 7/1954 | Wahlin | 239/565 |
| 2,903,189 | 9/1959 | Patton | 239/130 |
| 2,987,259 | 6/1961 | Lindquist | 239/130 |
| 3,226,030 | 12/1965 | Rossi | 239/135 |
| 3,239,960 | 3/1966 | Stevens | 239/135 |
| 3,621,799 | 11/1971 | Erga . | |
| 3,762,171 | 10/1973 | Bjorheim et al. . | |
| 3,802,396 | 4/1974 | Currie | 239/135 |
| 3,802,511 | 4/1974 | Good, Jr. | 239/154 |
| 3,814,321 | 6/1974 | Mulholland et al. | 239/135 |
| 3,844,449 | 10/1974 | Alter | 239/154 |
| 3,856,206 | 12/1974 | Bell et al. | 239/75 |
| 3,997,114 | 12/1976 | Hewett | 239/130 |
| 4,222,521 | 9/1980 | Nielson | 239/135 |
| 4,466,490 | 8/1984 | Eckels . | |
| 4,501,952 | 2/1985 | Lehrke | 239/135 |
| 4,508,957 | 4/1985 | Rocchitelli | 239/135 |
| 4,700,424 | 10/1987 | Hagen | 239/130 |
| 4,773,592 | 9/1988 | Oberdorfer | 239/137 |
| 4,801,088 | 1/1989 | Baker | 239/152 |
| 5,028,017 | 7/1991 | Simmons et al. | 239/135 |
| 5,102,051 | 4/1992 | Smith et al. | 239/526 |

FOREIGN PATENT DOCUMENTS

| | | |
|---|---|---|
| 3727291 | 8/1987 | Denmark . |
| 2383601 | 3/1977 | France . |
| 2724283 | 11/1978 | Germany ............. 239/130 |

Primary Examiner—Randolph A. Reese
Assistant Examiner—Spencer Warnick
Attorney, Agent, or Firm—Jerry T. Kearns

[57] ABSTRACT

A weed killing system utilizes hot water or steam, alone, or in combination with an herbicide to kill weeds. Cart, backpack, and vehicle mounted versions are disclosed in propane and electrically powered embodiments. A cart mounted version includes a detachable wheel assembly to allow selective conversion into a manually manipulable wand, and may be provided with an angularly adjustable bifurcated distribution nozzle. In electrically heated embodiments, Salt may be added to the heated water in order to increase the boiling point to enable higher effective application temperatures. A gas powered version includes a microprocessor control system for regulating water level in a tank portion of a heater, gas supply to a burner assembly, electric spark ignition of the burner assembly, and hot water or steam outlet dependent upon temperature and pressure levels in the tank portion.

19 Claims, 6 Drawing Sheets

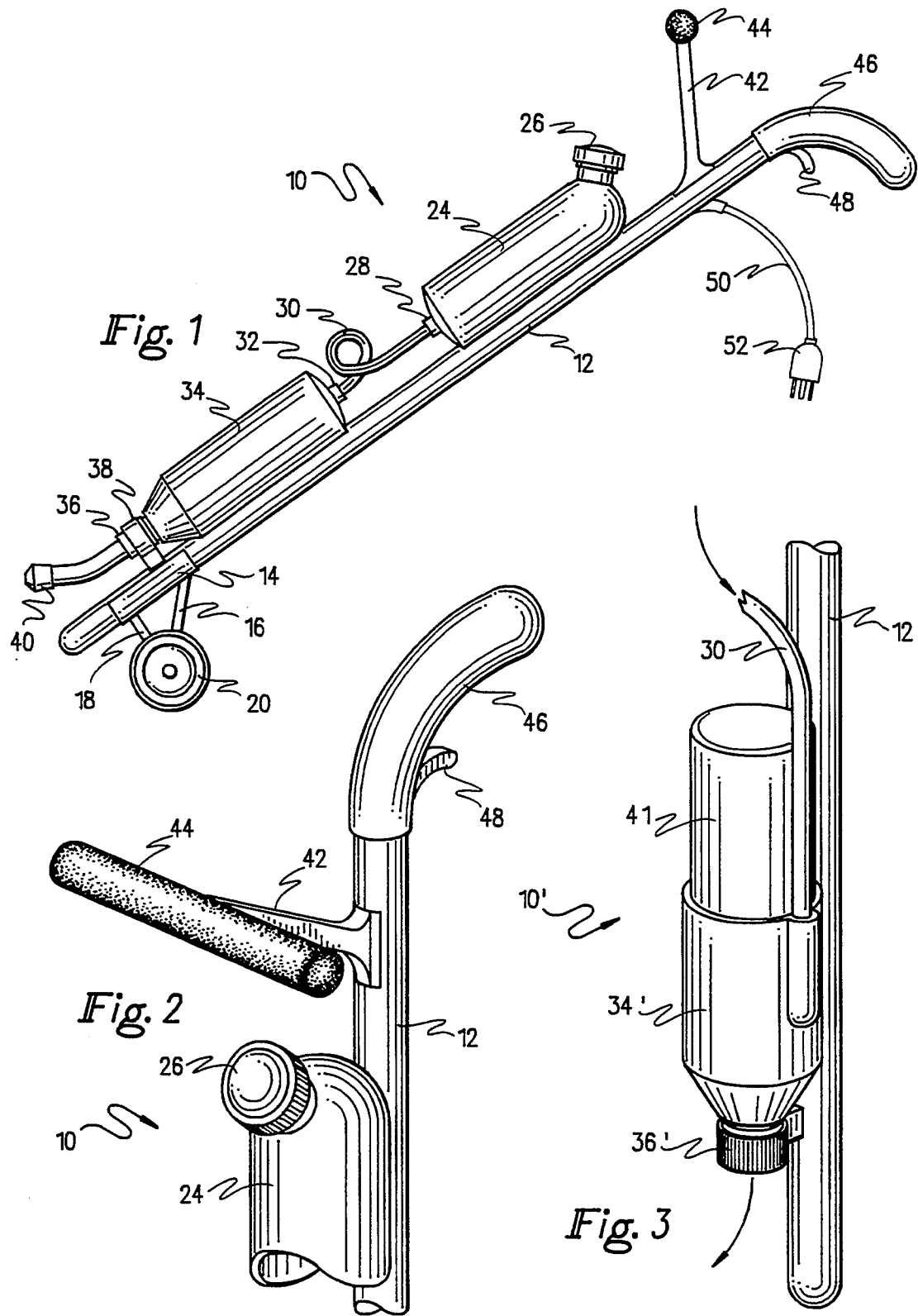

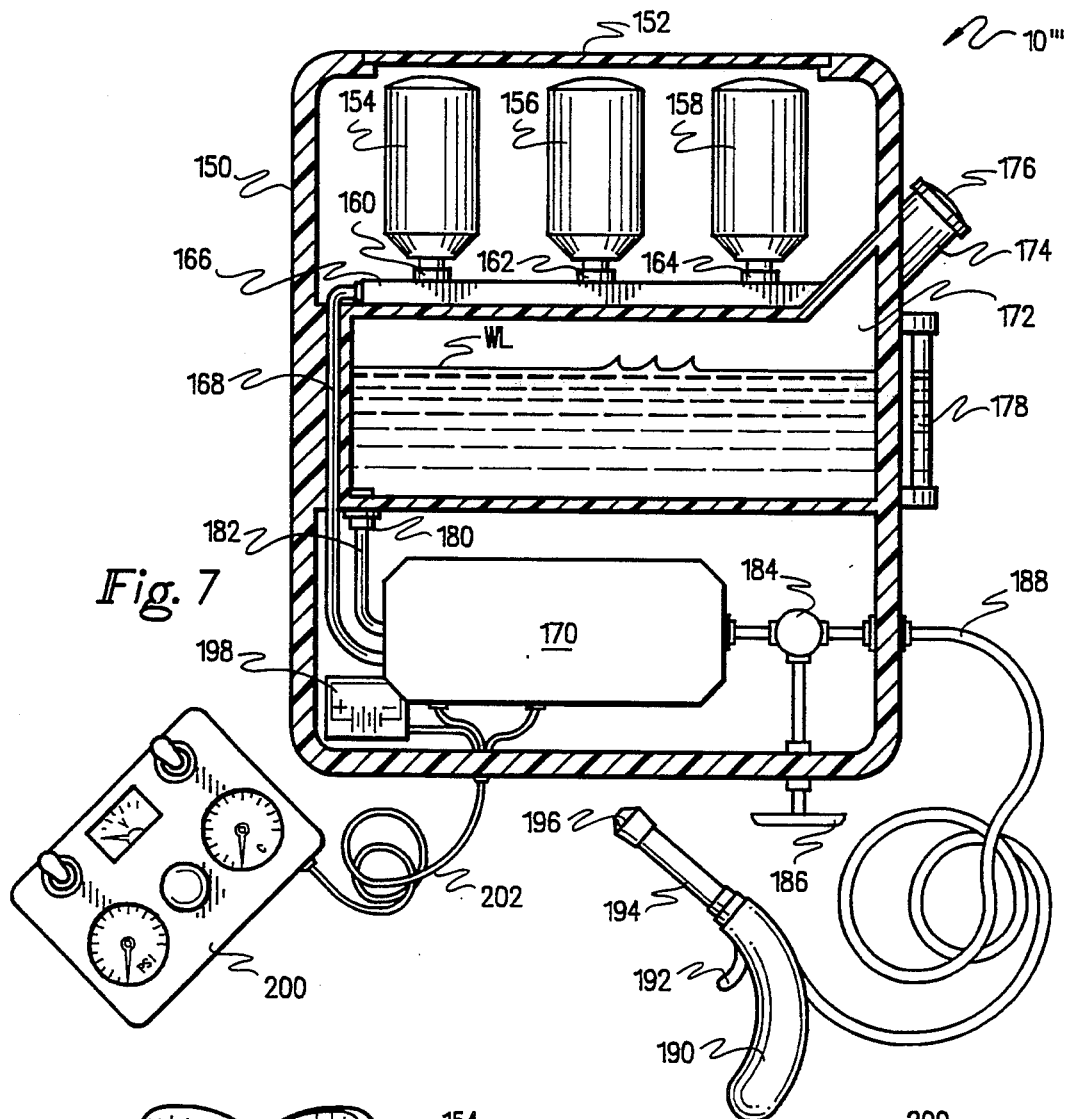
Fig. 7
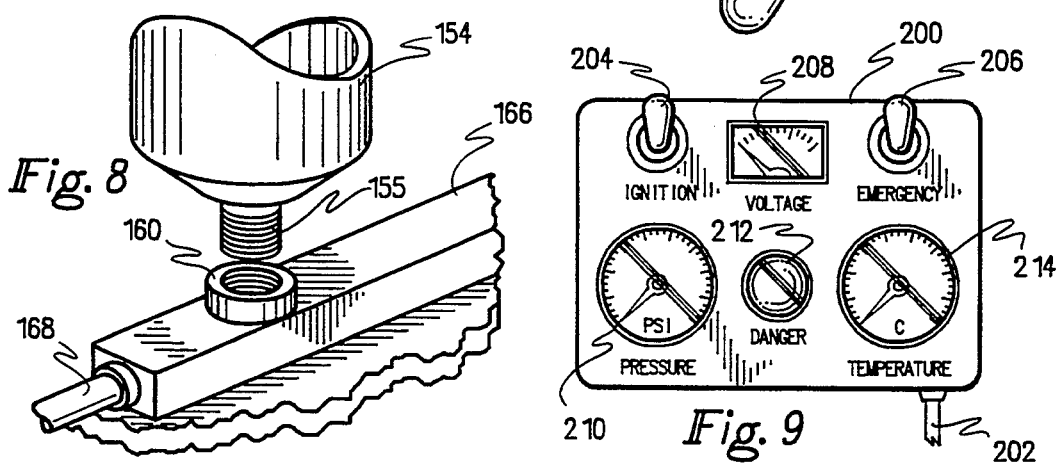

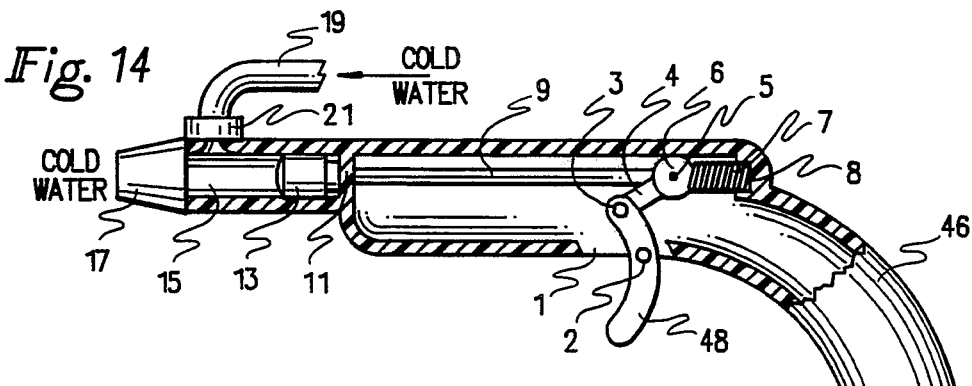
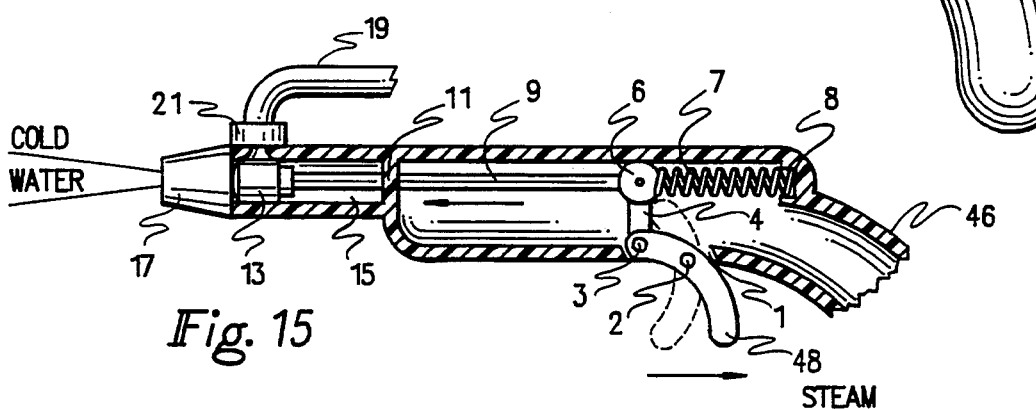
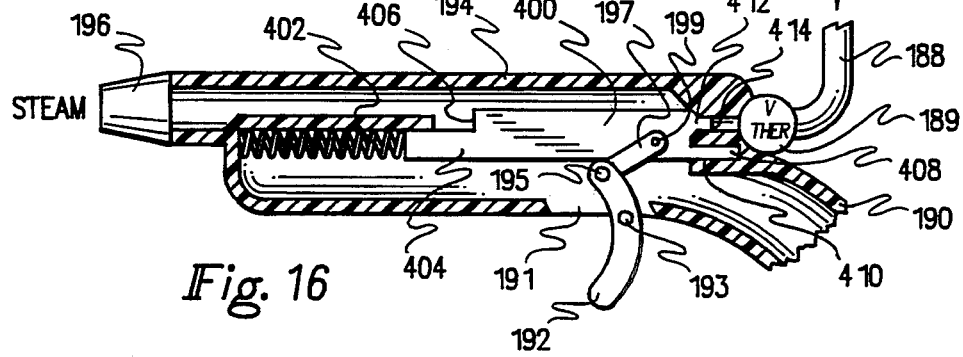
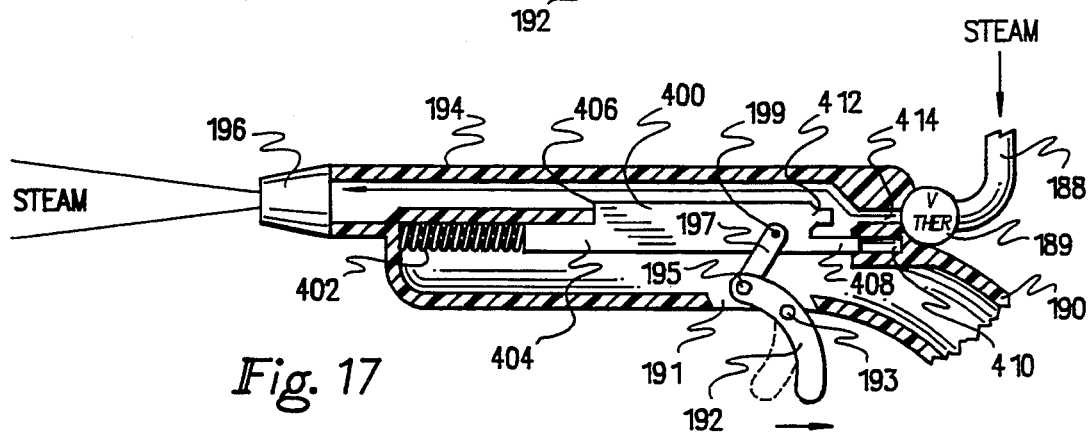

HOT WATER/STEAM WEED KILLING SYSTEM

BACKGROUND OF THE INVENTION

FIELD OF THE INVENTION

The present invention relates to weed killing systems, and more particularly pertains to an improved weed killing system which utilizes hot water or steam, alone, or in combination with an herbicide, to effectively kill weeds, fungus, and sterilize soil with a minimum negative environmental impact.

SUMMARY OF THE INVENTION

The present invention provides an improved weed killing system which utilizes hot water or steam, alone, or in combination with an herbicide to kill weeds. Cart, backpack, and vehicle mounted versions are disclosed in propane and electrically powered embodiments. A cart mounted version includes a detachable wheel assembly to allow selective conversion into a manually manipulable wand, and may be provided with an angularly adjustable bifurcated distribution nozzle. In electrically heated embodiments, Salt may be added to the heated water in order to increase the boiling point to enable higher effective application temperatures. A gas powered version includes a microprocessor control system for regulating water level in a tank portion of a heater, gas supply to a burner assembly, electric spark ignition of the burner assembly, and hot water or steam outlet dependent upon temperature and pressure levels in the tank portion.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 1 is a side elevational view of an electrically powered version of a cart mounted embodiment of the hot water/steam weed killing system of the present invention.

FIG. 2 is a partial perspective detail view of the embodiment of FIG. 1.

FIG. 3 is a partial perspective detail view illustrating a propane powered version of the car mounted hot water/steam weed killing system of the present invention.

FIG. 7 is a cross-sectional internal view illustrating the components of a portable backpack mounted, propane powered embodiment of the hot water/steam weed killing system of the present invention.

FIG. 8 is a perspective detail view illustrating the propane supply manifold of the embodiment of FIG. 7.

FIG. 9 is a plan view illustrating the control panel of the embodiment of FIG. 7.

FIG. 14 is a cross-sectional detail view illustrating the cold water injection gun mechanism of the cart mounted embodiment of FIGS. 1 through 5, in an inoperative position.

FIG. 15 is a cross-sectional detail view illustrating the cold water injection gun mechanism of the cart mounted embodiment of FIGS. 1 through 5, in an operative position.

FIG. 16 is a cross-sectional detail view illustrating the hot water/steam application nozzle of the backpack mounted embodiment of FIG. 7, in an inoperative position.

FIG. 17 is a cross-sectional detail view illustrating the hot water/steam application nozzle of the backpack mounted embodiment of FIG. 7, in an operative position.

DETAILED DESCRIPTION OF THE PREFERRED EMBODIMENT(S)

Figure 4:
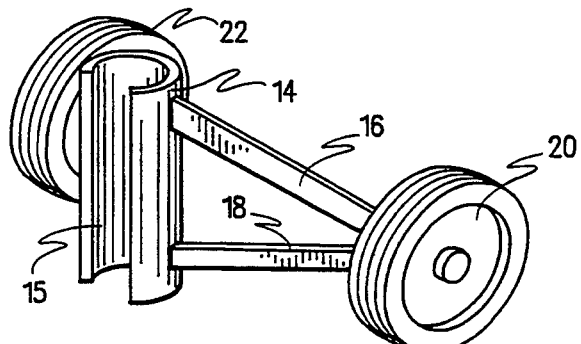
FIG. 4 is a perspective detail view of the wheel assembly of the cart mounted embodiment of FIGS. 1 through 3.
Figure 10:
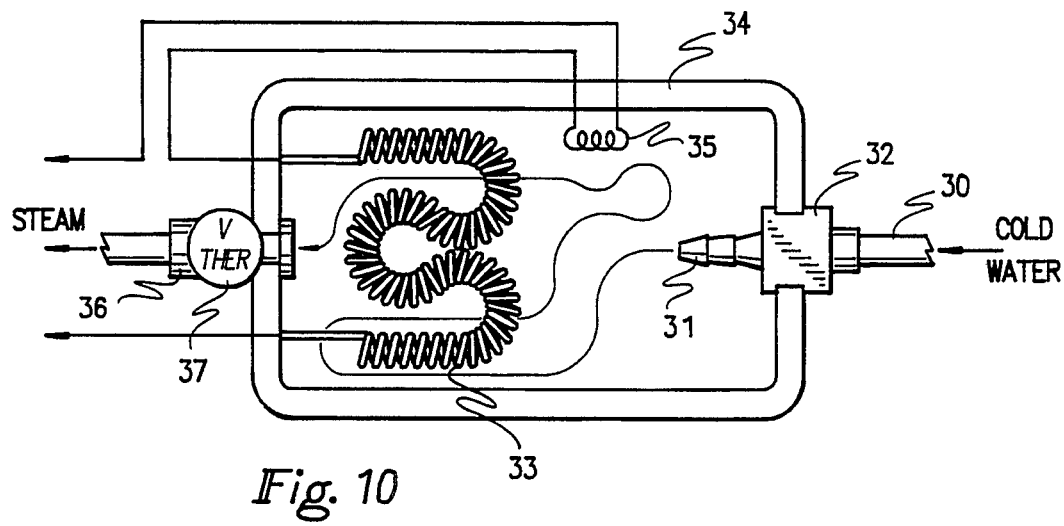
FIG. 10 is an internal plan detail view illustrating an electrically powered water heater for use with the weed killing system of the present invention.

Referring now to the drawings, wherein like reference numerals designate corresponding structure throughout the views, and referring in particular to FIGS. 1, 2, and 4, an improved weed killing system 10 according to a first preferred embodiment of the invention includes an elongated cylindrical wand 12 possessing a lower end to which a wheel assembly mounting bracket 14 is secured. The bracket 14 possesses a central open portion 15 dimensioned for frictional engagement with wand 12. Suitable set screws or retaining pins may be provided to releasably secure the bracket 14 in place. A plurality of brace struts 16 and 18 extending from bracket 14 mount wheels 20 and 22 for free rotation such that the weed killing system 10 may be manually rolled along the ground surface. Removal of the wheel assembly allows the weed killing system 10 to be carried in the manner of a spray wand. A water reservoir tank 24 mounted on an upper portion of wand 12 includes a fill cap 26 and an outlet 28 connected by a conduit 30 with an inlet port 32 of an electrical water heater 34. A bracket 38 secures a heated water outlet 36 terminating in a nozzle 40 to a lower end portion of wand 12. The weed killing system 10 includes a first hand grip 44 secured to wand 42 by an obliquely inclined standard 12, and a second pistol grip-type handle 46 at an upper end. A trigger mechanism 48 is operative to inject water from reservoir 24 into heater 34, which is electrically powered by connection of cord 50 with a conventional electrical outlet via plug 52. FIG. 10 illustrates an example electrical water heater 34, in which cold water is injected through port 32 and nozzle 31 into an enclosed tank provided with an electrical resistance suitably electrically insulated immersion heating element 33.

When temperature within the tank 34 reaches a predetermined level, a sensor 35 in conjunction with a control system causes an electrically actuated outlet valve 37 to open, allowing hot water or steam to be expelled through outlet 36.

FIGS. 14 and 15 illustrate an example water injection system for injecting water from reservoir 24 to heater 34. The hand grip 46 includes a slot I through which trigger 48 extends. Pivot mounting points 2 and 3 cooperate with link 4 and pivot mounting point 5 of bushing 6 to connect trigger 48, in conjunction with spring 7 and mounting socket 8, for reciprocal operation of piston rod 9. Rod 9 extends through partition wall 11 into cylinder 15, mounting piston 13 for reciprocal axial movement therein. Water inducted into cylinder 15 through supply line 19 from reservoir 24 and through one-way check valve 21 is expelled from cold water ejection port 17 into conduit 30 leading to heater 34 (FIG. 1).

Figure 11:
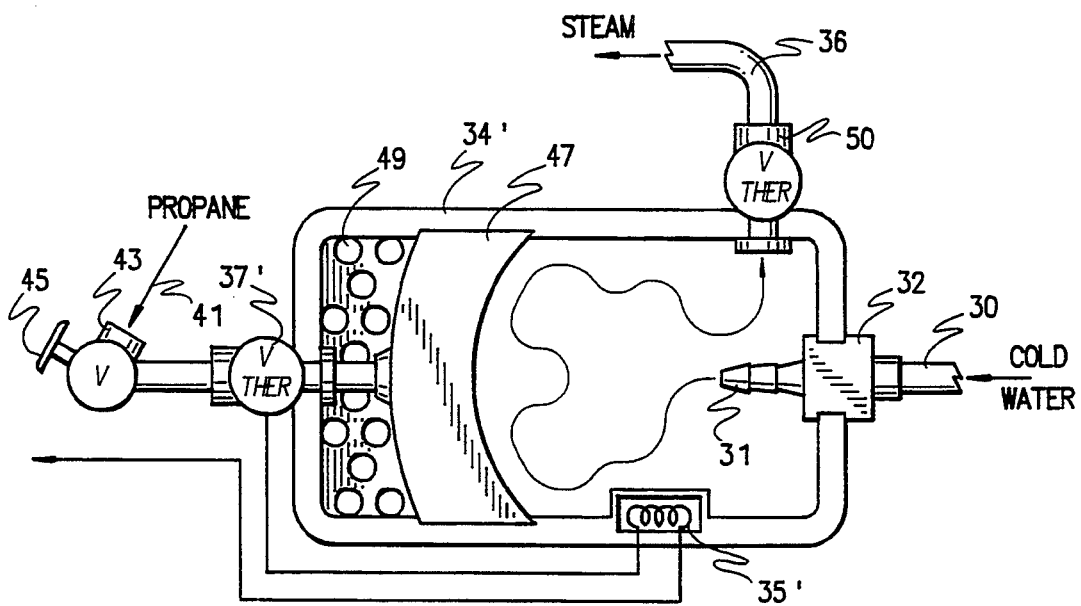
FIG. 11 is an internal plan detail view illustrating a propane powered water heater for use with the weed killing system of the present invention.

In a modified propane powered version 10' of the weed killing system illustrated in FIG. 3, a propane bottle 41 is mounted in a burner assembly 34' to which water is fed by conduit 30. Heated water exits burner assembly 34' via outlet 36'. FIG. 11 illustrates the internal construction of the gas powered heater 34', which includes a nozzle 31 which injects cold water through nozzle 31 into a heating chamber heated by a burner 47, and supplied with combustion air through suitable vents 49. An electrical supply valve 37' supplies propane from tank 41 through inlet 43 to burner 47, dependent upon temperature conditions-sensed by sensor 35'. A manual shut off valve 45 allows positive manual shut off of the gas supply. When temperature conditions in burner assembly 34' exceed a predetermined level, electrically controlled valve 50 opens, allowing heated water or steam to flow through outlet 36. Suitable conventional gas regulators to control supply pressures are also employed.

Figure 5:
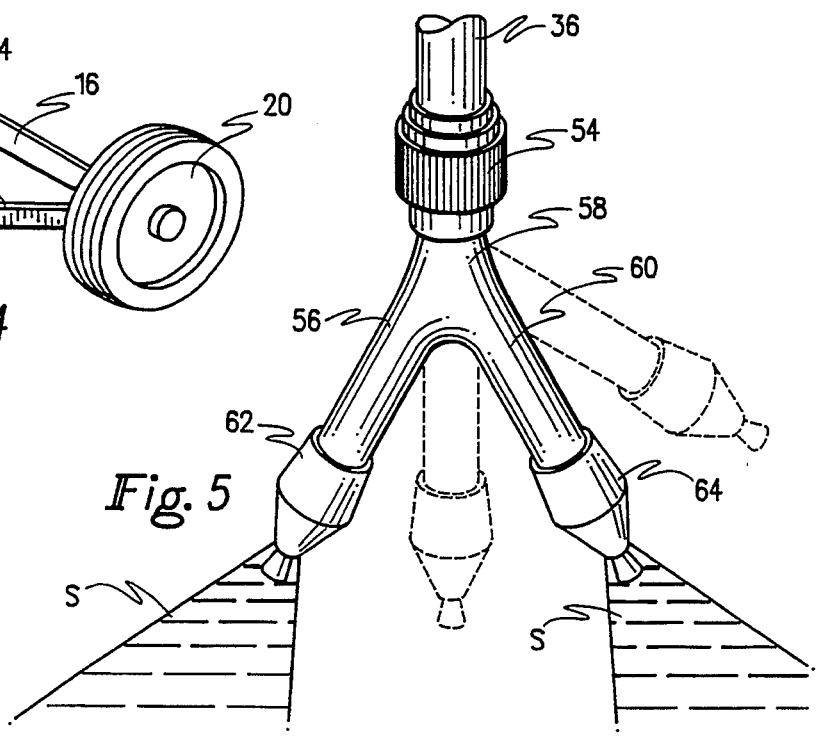
FIG. 5 is a perspective detail view illustrating an alternative adjustable bifurcated nozzle for applying hot water or steam to weeds.

FIG. 5 illustrates a modified alternative adjustable application nozzle assembly including a rotatable coupling 54 adapted for connection to outlet port 36 of heater 34 to allow rotational adjustment of a bifurcated nozzle yoke 58 about a vertical axis in order to allow selective orientation of nozzle legs 56 and 60. The bifurcated nozzle assembly includes two separate spray nozzles 62 and 64 for the application of discrete heated water or steam sprays S.

Figure 6:
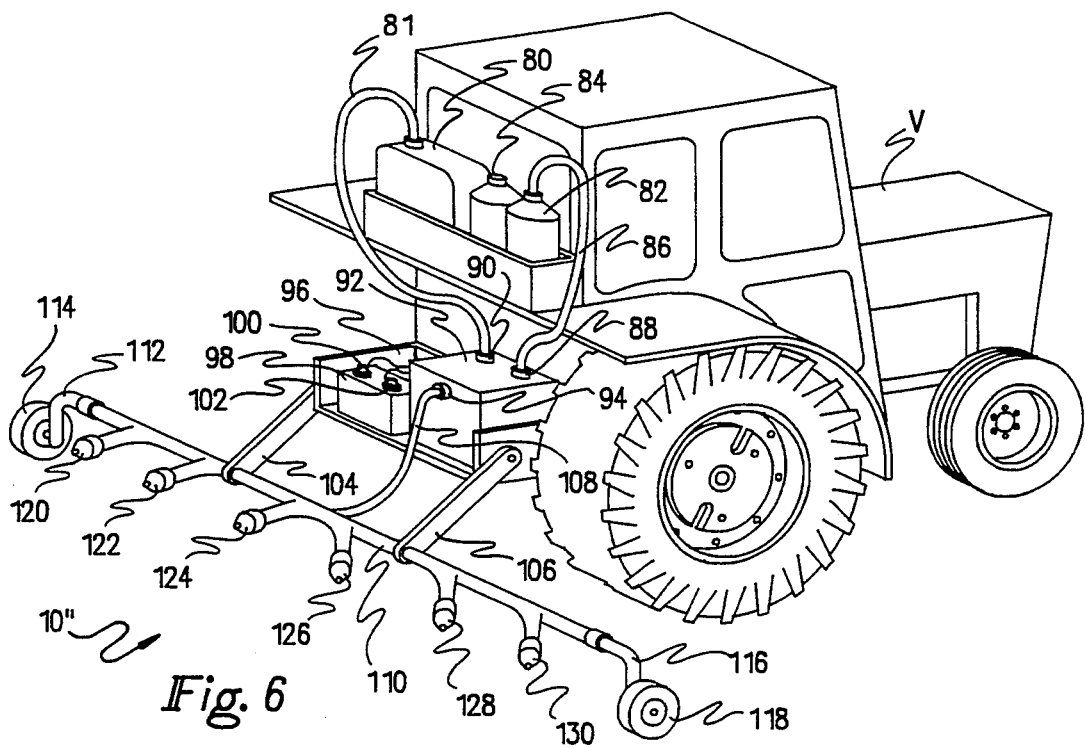
FIG. 6 is a perspective view illustrating a propane powered vehicle mounted embodiment of the hot water/steam weed killing system of the present invention.

FIG. 6 depicts a vehicle mounted embodiment 10" of the weed killing system in which a vehicle V such as a conventional tractor carriers a water reservoir 80 and propane bottles 82 and 84. Lines 81 and 86 feed water and propane to inlet ports 90 and 88 of a heater assembly 92 which includes an outlet port 94 connected to a distribution manifold 110 by an outlet line 108. Manifold 110 is supported by angle brackets 112 and 116 mounting wheels 114 and 118, and feeds heated water or steam to nozzles 120, 122, 124, 126, 128, and 130 for spray distribution over a relatively large area. Support struts 104 and 106 secure the manifold at the rear of the vehicle V. A battery 98 for powering control and ignitor components of the system 10' includes terminals 100 and 102 connected by conventional cables to the heater assembly 92.

Figure 13:
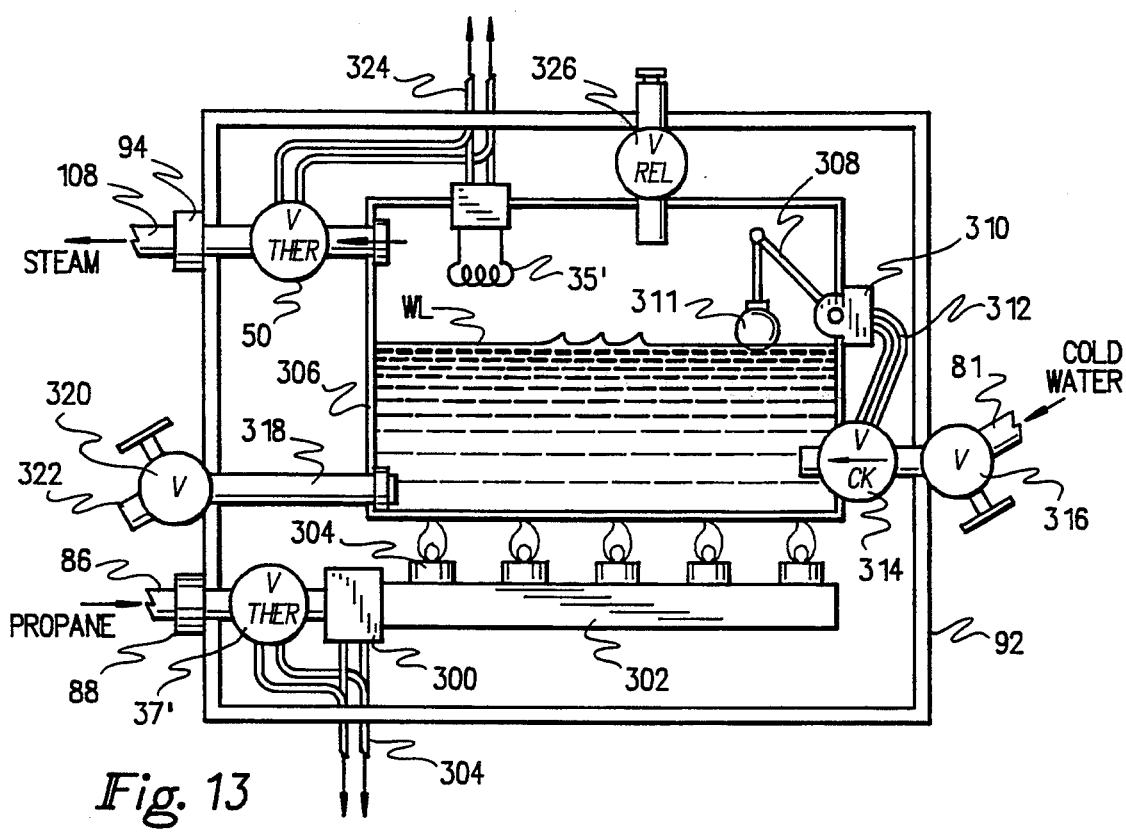
FIG. 13 is an internal plan detail view illustrating the propane powered water heater of the vehicle mounted embodiment of FIG. 6.

FIG. 13 illustrates the internal construction of the heater assembly 92, which includes a multiple burner manifold 302 connected to a plurality of burners 304 for heating water within tank 306. An electrical ignitor 300 controlled by a thermostatically operated valve 37" is connected to a control system for providing thermostatically controlled operation of burners 304 dependent on temperature conditions within tank 306 detected by sensor 35'. A float 311 connected by pivotal linkage 308 to a switch 310 actuates an electrically operated valve 314 via wires 312 to add water to heater tank 306 on a demand basis. A manual valve 316 allows supply water to be shut off, while a drain line 318, in conjunction with valve 320 and drain 322, allows the tank 306 to be drained when not in use for extended periods. An electrically operated outlet valve 50" allows heated water or steam to be expelled from tank 306 dependent upon temperature sensed by sensor 35" and fed to an electrical control system. A safety valve 326 is operative to vent tank 306 in the event a predetermined safe pressure level is exceeded.

FIGS. 7, 8, and 9 illustrate a portable backpack version 10''' of the weed killing system, in which a housing 150 includes an upper compartment accessible through cover 152 for the connection of replaceable propane cylinders 154, 156, and 158. A fuel gas supply manifold 166 connected to gas cylinders 154, 156, and 158 by respective couplings 160, 162, and 164 feeds propane via line 168 to a flash heater 170. As shown in FIG. 8, the propane cylinders, for example cylinder 154, include threaded neck portions 155 for engagement with couplings, for example coupling 160, of manifold 166. A water reservoir 172 within housing 150 includes a fill cap 176 connected to fill tube 174, and a sight glass 178 for manual monitoring of reservoir level. A lower outlet 180 of reservoir 172 supplies water via line 182 to flash heater 170. A valve 184 operated manually via handle 186 controls hot water or steam output to line 188, connected to application handle 190. Application handle 190 includes a trigger mechanism 192 operative to selectively expel hot water or steam from line 188 through conduit 194 and spray nozzle 196. As shown in FIGS. 16 and 17, the application handle 190 includes a slot receiving trigger 191, which is connected by a pivotal linkage 193, 195, 197, 199 to reciprocate a slide valve 400. A spring 402 engaging a forward end lug portion 404 of slide valve 400 biases a plug 412 into engagement with an inlet port 414. A guide rod 408 slides within cylinder 410 to maintain accurate alignment of valve 400. When temperature within heater 170 (FIG. 7) is above a preset limit, electrically actuated valve 189 opens, allowing selective application of hot water or steam by squeezing trigger 192, as shown in FIG. 17. An abutment shoulder 406 defines the full open position of slide valve 400.

Figure 12:
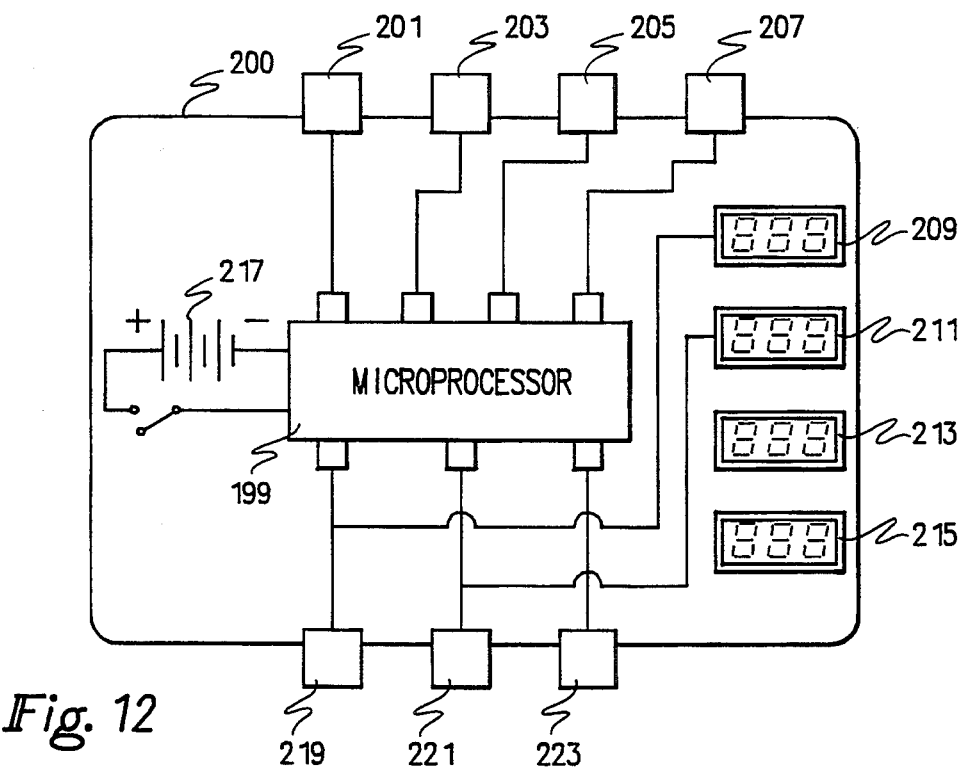
FIG. 12 is a block diagram illustrating the control system of the propane powered embodiment of the weed killing system of the present invention.

A control cable 202 connects electrical control 200 to battery 198 and flash heater 170. As shown in FIG. 9, control 200 includes a burner ignition enabling switch 204, voltage gage 208, shut down switch 206, pressure gage 210, warning lamp 212, and temperature gage 214. As shown in FIG. 12, an example control system 200 includes a microprocessor 199 powered by a battery 217 and connected to control signal inputs 219 pressure sensor, 221 temperature sensor, and 223 water level sensor, as well as control signal outputs 201 propane supply valve, 203 water supply valve, 205 steam output valve, and 207 burner spark ignitor. LED displays 209, 211, 213, and 215 display, respectively, pressure, temperature, water reservoir level, and remaining propane supply. The control system 200 preferably includes an averaging circuit in order to compensate for fluctuations in water level in the reservoir due to motion caused by transport.

In addition to using hot water or steam alone, the weed killing systems disclosed herein may employ admixed insecticides, herbicides or fungicides such as methyl hydrate. Such additives would preferably be introduced by induction into the hot water or steam just before leaving the application nozzle to avoid contaminating or clogging the system. The additive induction supply line would preferably be provided with and adjustable valve to allow precise control of mixture ratios. Additionally, salt or other chemicals may be added to the supply water to raise the boiling point prior to heating.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A portable backpack weed killing system, comprising:
    a water supply source;
    a gas powered heater for heating water from said supply source;
    an application nozzle including a manually operable valve for selectively distributing heated water or steam from said heater on weeds;
    a control mechanism for regulating said distribution of heated water or steam; and
    said control mechanism including a sensor for detecting temperature of water in said heater and an electrically actuated valve disposed upstream from said manually operable valve and operably connected to said sensor to allow water flow from said heater to said application nozzle only when temperature of water in said heater exceeds a predetermined level, regardless of the position of said manually operable valve.

2. The weed killing system of claim 1, further comprising an herbicide mixed with said heated water or steam.

3. The weed killing system of claim 1, further comprising salt mixed with said water from said water supply source to raise the boiling point of said water.

4. The weed killing system of claim 1, further comprising methyl hydrate mixed with said heated water or steam.

5. The weed killing system of claim 1, further comprising a thermostatically controlled regulator valve for regulating gas to said burner dependent upon temperature of water in a tank portion of said heater.

6. The weed killing system of claim 1, wherein said heater comprises a tank portion operably connected to said water supply source and a gas burner having an electrical igniter and a thermostatically controlled gas supply valve.

7. The weed killing system of claim 1, wherein said heater comprises a flash heater.

8. The weed killing system of claim 1, wherein said manually operable valve comprises:
    a slide valve mounted for reciprocal sliding movement in said application nozzle, said slide valve including a plug adapted for engagement with an inlet port of said nozzle in a closed position to block fluid flow and a guide rod disposed in sliding engagement within a cylinder in said application nozzle to maintain alignment of said slide valve in said nozzle;
    a spring in said application nozzle biasing said slide valve to said closed position; and
    a trigger connected to said slide valve by a pivotal linkage and operative to move said slide valve to an open position against the bias of said spring upon manual actuation of said trigger.

9. A portable backpack mounted weed killing system, comprising:
    housing means adapted for carrying in the manner of a backpack by a user;
    a water storage means in said housing means;
    gas powered heating means in said housing for heating water from said storage means;
    gas supply means in said housing operably connected for supplying gas to said heating means;
    application means including manually actuatable valve means operably connected for selectively distributing heated water or steam from said heating means on weeds;
    electrically actuated outlet valve means disposed upstream of said manually actuatable valve means and operably connected to said application means for allowing distribution of heated water or steam from said heating means only upon actuation of said electrically actuated outlet valve means regardless of the position of said manually actuatable valve means; and
    control means operably connected for regulating said heating means and said distribution of heated water or steam, said control means including sensing means for detecting temperature conditions in said heating means, and means for controlling said heating means and said electrically actuated outlet valve means in response to said detected temperature conditions such that distribution of heated water or steam is permitted only after a predetermined temperature level has been reached.

10. The weed killing system of claim 9, further comprising an herbicide mixed with said heated water or steam.

11. The weed killing system of claim 9, further comprising salt mixed with said water from said water storage means to raise the boiling point of said water.

12. The weed killing system of claim 9, further comprising methyl hydrate mixed with said heated water or steam.

13. The weed killing system of claim 9, wherein said gas powered heating means comprises a tank portion operably connected to said water storage means and a gas burner having an electrical igniter and a thermostatically controlled gas supply valve.

14. The weed killing system of claim 9, further comprising control means operably connected for regulating said heating means and said distribution of heated water or steam, said control means including sensing means for detecting temperature and pressure conditions in a tank portion of said heating means, and means for controlling said heating means and said outlet means in response to said detected temperature and pressure conditions.

15. The weed killing system of claim 9, further comprising at least one pressurized gas supply source in said housing means operably connected for supplying gas to said heating means.

16. The weed killing system of claim 9, wherein said gas powered heating means comprises a flash heater.

17. The weed killing system of claim 9, wherein said manually actuatable valve means comprises:
- a slide valve mounted for reciprocal sliding movement in said application nozzle, said slide valve including a plug adapted for engagement with an inlet port of said nozzle in a closed position to block fluid flow and a guide rod disposed in sliding engagement within a cylinder in said application nozzle to maintain alignment of said slide valve in said nozzle;
- a spring in said application nozzle biasing said slide valve to said closed position; and
- a trigger connected to said slide valve by a pivotal linkage and operative to move said slide valve to an open position against the bias of said spring upon manual actuation of said trigger.

18. A portable backpack mounted weed killing system, comprising:
- a housing adapted for carrying in the manner of a backpack by a user;
- a water supply reservoir in said housing;
- a gas powered flash heater for heating water from said reservoir, said heater including a tank portion operably connected to said reservoir and a gas burner having an electrical igniter and a thermostatically controlled gas supply valve;
- at least one pressurized gas supply source in said housing operably connected for supplying gas to said heater;
- an application nozzle including a manually actuated valve operably connected to said tank portion for distributing heated water or steam from said heater on weeds;
- a thermostatically controlled electrically actuated outlet valve disposed upstream of said manually actuated valve and operably connected to said application nozzle for allowing distribution of heated water or steam from said tank portion of said heater only after a predetermined temperature level has been reached, regardless of the position of said manually actuated valve; and
- a control mechanism operably connected for regulating said heater and said distribution of heated water or steam, said control system including sensors for detecting temperature and pressure conditions in said tank portion of said heater, and means for controlling said igniter, said gas supply valve, and said electrically actuated outlet valve in response to said detected temperature and pressure conditions.

19. The weed killing system of claim 18, wherein said manually actuated valve comprises:
- a slide valve mounted for reciprocal sliding movement in said application nozzle, said slide valve including a plug adapted for engagement with an inlet port of said nozzle in a closed position to block fluid flow and a guide rod disposed in sliding engagement within a cylinder in said application nozzle to maintain alignment of said slide valve in said nozzle;
- a spring in said application nozzle biasing said slide valve to said closed position; and
- a trigger connected to said slide valve by a pivotal linkage and operative to move said slide valve to an open position against the bias of said spring upon manual actuation of said trigger.

* * * * *